(12) United States Patent
Poncelet et al.

(10) Patent No.: US 10,399,115 B2
(45) Date of Patent: Sep. 3, 2019

(54) METHOD FOR COATING WITH DISPERSIONS OF ACTIVE INGREDIENTS COATED IN A POLYMER LAYER

(75) Inventors: Olivier Poncelet, Grenoble (FR); Olivier Renard, Fontanil-cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1041 days.

(21) Appl. No.: 13/521,652

(22) PCT Filed: Jan. 11, 2011

(86) PCT No.: PCT/IB2011/050115
§ 371 (c)(1),
(2), (4) Date: Jan. 28, 2013

(87) PCT Pub. No.: WO2011/083448
PCT Pub. Date: Jul. 14, 2011

(65) Prior Publication Data
US 2013/0130018 A1     May 23, 2013

(30) Foreign Application Priority Data
Jan. 11, 2010   (FR) ...................... 10 50134

(51) Int. Cl.
*B05D 3/02* (2006.01)
*B82Y 30/00* (2011.01)
(Continued)

(52) U.S. Cl.
CPC ............ *B05D 3/0254* (2013.01); *B82Y 30/00* (2013.01); *C09B 67/0005* (2013.01);
(Continued)

(58) Field of Classification Search
CPC . B82Y 30/00; C09B 67/0005; C09B 67/0096; C09B 67/0097; C09C 1/3676;
(Continued)

(56) References Cited

U.S. PATENT DOCUMENTS 6,951,836 B2 * 10/2005 Jahns .................. C11D 3/3703
510/101
2002/0039593 A1   4/2002 Tucci et al. ................... 424/411
(Continued)

FOREIGN PATENT DOCUMENTS

EP            0807708 A3 *  12/1998  ............. A41D 31/00
WO   WO 2005/061602       7/2005
(Continued)

OTHER PUBLICATIONS

Qin et al. "Enhanced ultraviolet sensitivity of zinc oxide nanoparticle photoconductors by surface passivation" Optical Materials available online Oct. 2010. (Year: 2010).*
(Continued)

*Primary Examiner* — Robert S Walters, Jr.
(74) *Attorney, Agent, or Firm* — Norton Rose Fulbright US LLP

(57) ABSTRACT

The invention seeks protection for a novel method for the surface functionalization of solid materials with one or more active ingredients intended to confer specific properties thereon, such as anti-UV, fluorescence or coloring properties.

21 Claims, 1 Drawing Sheet

(51) Int. Cl.
| | |
|---|---|
| C09B 67/08 | (2006.01) |
| C09B 67/54 | (2006.01) |
| C09B 67/02 | (2006.01) |
| C09C 1/36 | (2006.01) |
| C09C 3/10 | (2006.01) |
| D06M 11/44 | (2006.01) |
| D06M 11/46 | (2006.01) |
| D06M 11/47 | (2006.01) |
| D06M 13/07 | (2006.01) |
| D06M 13/13 | (2006.01) |
| D06M 13/203 | (2006.01) |
| D06M 13/352 | (2006.01) |
| D06M 15/263 | (2006.01) |
| D06M 15/333 | (2006.01) |
| D06M 16/00 | (2006.01) |
| D06M 23/08 | (2006.01) |
| D06M 23/12 | (2006.01) |
| D06P 1/52 | (2006.01) |
| C09D 7/62 | (2018.01) |
| C09D 7/48 | (2018.01) |
| C09D 7/40 | (2018.01) |
| C08K 5/00 | (2006.01) |
| C08K 5/07 | (2006.01) |
| C08K 5/3475 | (2006.01) |
| C08K 9/08 | (2006.01) |

(52) U.S. Cl.
CPC ...... *C09B 67/0096* (2013.01); *C09B 67/0097* (2013.01); *C09C 1/3676* (2013.01); *C09C 3/10* (2013.01); *C09D 7/48* (2018.01); *C09D 7/62* (2018.01); *C09D 7/67* (2018.01); *C09D 7/68* (2018.01); *D06M 11/44* (2013.01); *D06M 11/46* (2013.01); *D06M 11/47* (2013.01); *D06M 13/07* (2013.01); *D06M 13/13* (2013.01); *D06M 13/2035* (2013.01); *D06M 13/352* (2013.01); *D06M 15/263* (2013.01); *D06M 15/333* (2013.01); *D06M 16/00* (2013.01); *D06M 23/08* (2013.01); *D06M 23/12* (2013.01); *D06P 1/5228* (2013.01); *C01P 2004/64* (2013.01); *C08K 5/005* (2013.01); *C08K 5/07* (2013.01); *C08K 5/3475* (2013.01); *C08K 9/08* (2013.01); *Y10T 428/254* (2015.01)

(58) Field of Classification Search
CPC ...... C09C 3/10; C09D 7/1225; C09D 7/1241; C09D 7/1266; C09D 7/1275; C09D 7/62; C09D 7/48; C09D 7/67; C09D 7/68; D06M 11/44; D06M 11/46; D06M 11/47; D06M 13/07; D06M 13/13; D06M 13/2035; D06M 13/352; D06M 15/263; D06M 15/333; D06M 16/00; D06M 23/08; D06M 23/12; D06P 1/5228; B05D 3/0254; Y10T 428/254; C08K 5/005; C08K 5/07; C08K 5/3475; C08K 9/08; C01P 2004/64
USPC ...................................................... 427/385.5
See application file for complete search history.

(56) References Cited

U.S. PATENT DOCUMENTS

| | | | |
|---|---|---|---|
| 2003/0059471 A1* | 3/2003 | Compton | A61K 9/0056 424/489 |
| 2007/0149654 A1 | 6/2007 | Cheng et al. | 523/336 |
| 2009/0311336 A1* | 12/2009 | Jones | A61K 8/35 424/496 |
| 2012/0029146 A1* | 2/2012 | Matsui | C08G 18/0823 524/591 |

FOREIGN PATENT DOCUMENTS

| | | | | |
|---|---|---|---|---|
| WO | WO 2008/061885 | * | 5/2008 | B01J 13/14 |
| WO | WO 2010/122599 | * | 10/2010 | C08G 18/00 |

OTHER PUBLICATIONS

Patel et al. "Preparation and Characterization of Oxybenzone-Loaded Gelatin Microspheres for Enhancement of Sunscreening Efficacy" Drug Delivery, 13:5, 323-330.*

* cited by examiner

METHOD FOR COATING WITH DISPERSIONS OF ACTIVE INGREDIENTS COATED IN A POLYMER LAYER

This application is a national phase application under 35 U.S.C. § 371 of International Application No. PCT/IB2011/050115 filed 11 Jan. 2011, which claims priority to French Application No. 1050134 filed 11 Jan. 2010. The entire contents of each of the above-referenced disclosures is specifically incorporated herein by reference without disclaimer.

The present invention is targeted at providing a process of use in the surface functionalization of substrates with one or more active ingredients dedicated to providing them with specific properties, such as properties of resistance to UV radiation, fluorescence properties or dyeing properties.

Numerous techniques exist for the surface functionalization of materials and are employed in highly diverse applications for conferring specific properties on the material, indeed even for protecting it.

These techniques are generally worked out from the viewpoint of the impossibility either of establishing a direct connection between the active ingredient and the substrate under consideration or of guaranteeing, when it is possible, that this bond will be lasting over time.

A technique generally considered for compensating for a lack of interactivity of an active ingredient with regard to a substrate consists in functionalizing the active ingredient under consideration so as to endow it with a functional site capable of interacting with a functional group present on the substrate. However, apart from the fact that this alternative is restrictive with regard to the implementation, it may also unfortunately be prejudicial to the level of activity of the active ingredient. This is because this structural transformation of the active ingredient may furthermore affect its physical or physicochemical properties which it is specifically desired to take advantage of at the substrate.

Another alternative is targeted at formulating the active ingredient within a binder itself exhibiting an affinity with the substrate, so as to provide for its adhesion thereto. However, this binder may in its turn be harmful to the appearance of the properties of the active ingredient and, furthermore, generally does not make it possible to functionalize the substrate with a high content of active ingredient.

For these reasons, it would be desirable to have available a method of functionalization which is simple to carry out, which does not require transformation of the active ingredient molecule and which is not likely to affect the activity of the active ingredient.

Furthermore, at the same time as this problem of a lack of interactivity of an active ingredient with a substrate, there exists that posed by the hydrophobic nature of some active ingredients. This lack of aqueous solubility makes it necessary to employ organic solvent(s) which, for an obvious reason, are not in harmony with environmental and safety constraints.

It would thus also be desirable to be able to dispense with the use of such solvents and thus to render these active ingredients compatible with use in an aqueous medium.

The present invention is targeted specifically at meeting all of the abovementioned needs.

Figure 1:
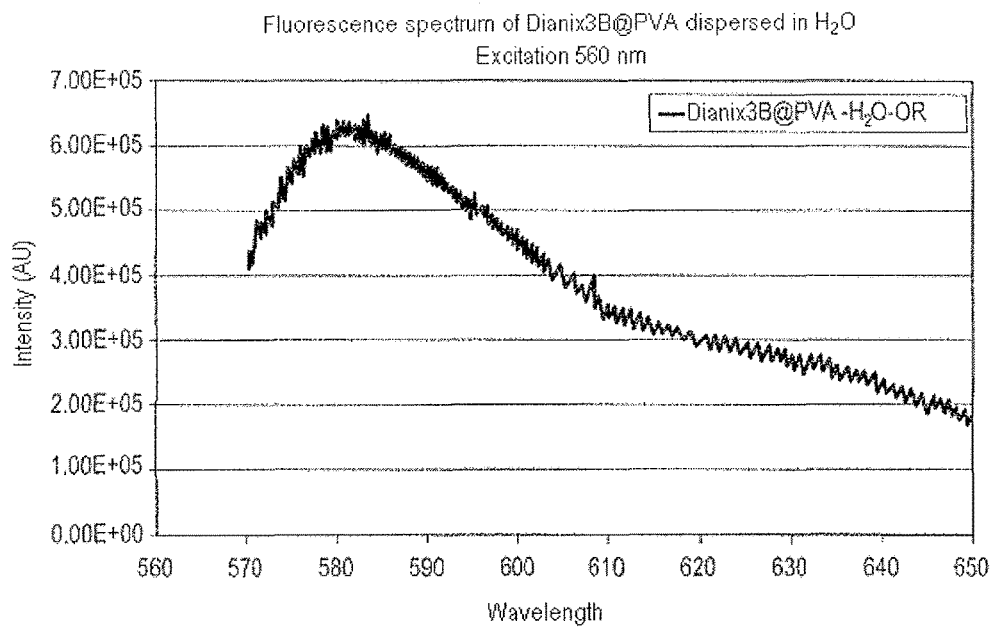
FIG. 1 is a fluorescence spectrum of a sample of Dianix3B@PVA dispersed in $H_2O$. The fluorescent powder exhibits the absorption spectrum characteristic of the starting dye.

Thus, the invention is targeted at providing a process of use in the surface functionalization of a substrate, generally an organic substrate, with at least one active ingredient, characterized in that it brings said surface into contact with specific nanoparticles comprising said active ingredient.

More specifically, the invention relates to a process of use in forming a coating based on at least one active ingredient at the surface of a substrate, in particular an organic substrate, characterized in that it comprises at least the stages consisting in:

(1) having available an aqueous dispersion of nanoparticles or of a mixture of nanoparticles having a core formed in all or part of at least one active ingredient and coated with an outer layer formed of at least one hydrophilic polymer, (2) bringing said surface of said substrate into contact with said aqueous dispersion, and (3) exposing said substrate obtained on conclusion of the preceding stage to conditions propitious to the formation, at the surface of said substrate, of a polymeric film formed of said nanoparticles.

In particular, the nanoparticles employed in stage (1) of the process of the invention have an active ingredient(s)/hydrophilic polymer(s) ratio by weight varying from 0.2 to 0.4.

The use of an active ingredient in the form of nanoparticles as are defined above is particularly advantageous insofar as it makes it possible to access a very dense coating and thus a coating particularly enriched in active ingredient.

Thus, the coating formed can have a degree of filling by a volume of greater than 70%, indeed even at 74%.

In particular, the coating of said substrate obtained on conclusion of the process according to the invention can have a density of active ingredients at least equal to 1 g per $m^2$ of coating.

Advantageously, the aqueous dispersion is devoid of "binder" compounds.

Within the meaning of the invention, the term "binder" denotes any compound more particularly employed from the viewpoint of its ability to contribute to the formation of a film. They are more particularly "film-forming" compounds, such as, for example, polyacrylics, polyvinyl acetate (PVA), polyurethanes or coatings of any type which are obtained by sol-gel processes, such as, for example, $SiO_2$, $ZrO_2$, $TiO_2$ or $Al_2O_3$.

The invention is more particularly based on the unexpected observation by the inventors that the fact of employing an active ingredient in the form of nanoparticles in accordance with the present invention makes it possible to access an optimized surface functionalization.

From the viewpoint of their homogeneous shape, these nanoparticles can be deposited adjacent to one another and can thus form a dense and orderly network on the surface to be functionalized.

The coating thus formed cannot be produced either with the active ingredient in the pure state or with a composition of binder type in which said nanoparticles would be dispersed.

This is because, in this second alternative form, the organization of the nanoparticles within the film formed by the binder comprising the nanoparticles remains completely random. It is therefore impossible in this case to obtain an optimum organization of nanoparticles, and the content of fillers by volume of the corresponding coating is lower than that accessible according to the invention.

According to a preferred embodiment, stage (3) of the process according to the invention is a drying stage.

According to an alternative embodiment, the combined stages (2) and (3) can be repeated at least once on conclusion of stage (3).

According to this alternative form, the layer of the polymeric film formed of said nanoparticles is again brought into contact with an aqueous dispersion of said nanoparticles of the composition as defined in stage (1) and the layer thus formed is subjected to a consecutive stage (3).

The film of nanoparticles which is formed in the context of the present invention is advantageous in several respects.

First of all, the presence of polymer(s) at the surface of the particles makes it possible to optimize their compatibility with the material to be treated but also that between the particles themselves by interpenetration of the chains of polymers with one another. By virtue of all of these factors, a coating is obtained which is particularly compact and attaches to the material without use of binder.

The coating obtained according to the invention in addition has good properties of adhesion with regard to the substrate on which it is deposited and good mechanical strength.

The arrangement of the nanoparticles forming the coating is such that it additionally makes it possible to deposit more active ingredient per unit of surface area in comparison with a single deposition of active ingredient and thus makes it possible to benefit optimally from the properties of said active ingredient. This optimization is in no way achieved when nonfunctionalized particles are employed in combination at least with a binder dedicated to attaching them to their substrate.

Furthermore, the use of the active ingredients in the form of nanoparticles makes it possible to access an advantageous deposition architecture, especially particularly advantageous when it is desired to produce a coating of active ingredient at the surface of a woven or nonwoven fibrous substrate.

Thus, from the viewpoint of their size, the nanoparticles, for example comprising a UV-absorbing active ingredient, remain at the surface of the fibers, unlike the active ingredient not formulated in the form of nanoparticles, which, from the viewpoint of its smaller size, has a tendency to penetrate into the fibers to the disadvantage of its UV-absorbing effect. Consequently, with the same amount of active ingredient, the invention makes it possible to significantly optimize the anti-absorbing effect desired at the surface of the fibrous substrate.

As specified above, the process according to the invention is very particularly advantageous for the surface functionalization with a UV absorber and the coating thus formed then has properties of absorbing ultraviolet radiation.

The process according to the invention is particularly advantageous with regard to organic UV absorbers.

This is because the latter exhibit good properties of UV absorbance and of stability. However, most organic chemical compounds of this type have a strongly hydrophobic nature which makes it difficult, indeed even impossible, to employ them in aqueous formulations. In order to overcome this lack of solubility in an aqueous medium, it is therefore necessary either to employ them in an organic solvent medium or to chemically modify them in order to confer on them the solubility required in an aqueous medium. In addition, in all cases, their level of surface loading of a support remains limited and generally does not exceed 0.03 mg/m² of active ingredient.

Consequently, the process according to the invention advantageously makes it possible to compensate for all of the deficiencies raised above.

Nanoparticles

The nanoparticles under consideration according to the invention for their ability to form a coating at the surface of a substrate can advantageously have the same size, indeed even different but therefore controlled sizes, and an appropriate dispersibility in order to render them compatible, for example, with an application by spraying according to conventional methods.

In the alternative embodiment where two different sizes are considered, the population which has the smaller particle size makes it possible, by blocking the spaces left between the nanoparticles of the population having the greater particle size, to greatly increase the degree of filling by volume.

Thus, the nanoparticles used in the process according to the invention can advantageously have a mean size of less than 500 nm, preferably less than 300 nm, more preferably of less than 200 nm.

More particularly, their size varies from 300 nm to 10 nm and in particular from 100 nm to 20 nm.

This size can be determined by Dynamic Light Scattering, it being possible for the size of the inorganic core to be itself determined by high resolution MGT.

As specified above, the nanoparticles are formed of a polymeric and hydrophilic outer layer and of a core formed in all or part of at least one active ingredient.

They may or may not be monodisperse.

In order to access a coating having a particularly high degree of filling by volume, indeed even of greater than 74%, it can be advantageous to employ two size populations of nanoparticles in order to obtain a much more compact coating.

Polymeric Outer Layer

This outer layer is polymeric in nature and advantageously noncrosslinked.

As regards the polymer(s) forming this layer, it/they has/have a strong hydrophilic nature with a sufficiently long molecular chain length to exhibit an affinity with the organic core.

A hydrophilic polymer suitable for the invention advantageously has a molecular weight of greater than 10 000 g/mol, in particular of greater than 20 000 g/mol and more particularly varying from 25 000 to 600 000 g/mol.

This hydrophilic polymer can, for example, be chosen from: polyvinyl alcohols, dextran, sodium alginate, polyaspartic acid, polyethylene glycol, polyethylene oxide, polyvinylpyrrolidone, polyacrylic acid and its salts, polyacrylamide, poly(N-isopropyl-acrylamide), poly(hydroxyethyl acrylate), poly(sodium styrenesulfonate), poly(2-acrylamido-2-methyl-1-propylenesulfonic acid), polysaccharides, cellulose derivatives, copolymers of the abovementioned polymers and their blends.

Other polymers which are water-soluble, copolymers or derivatives of such materials will be apparent to a person skilled in the art.

More particularly, the hydrophilic polymer is a polyvinyl alcohol or a polyacrylic acid.

The polyvinyl alcohols used advantageously have a molecular weight of greater than 10 000 g/mol, in particular of greater than 20 000 g/mol and more particularly varying from 25 000 to 500 000 g/mol.

For their part, the polyacrylic acids advantageously have a molecular weight of 10 000 to 600 000, more particularly of between 100 000 and 600 000 and in particular of the order of 450 000 g/mol.

According to an advantageous alternative embodiment, the nanoparticles have an outer layer formed in all or part of at least one polyvinyl alcohol with a molecular weight varying from 25 000 to 100 000 g/mol and more particularly from 25 000 to 50 000 g/mol.

The thickness of the polymeric outer layer can vary from 245 to 10 nm.

For its part, the diameter of the particles can vary from 100 to 600% of the size of the core.

Active Ingredient

The active ingredient present in the nanoparticles used according to the invention can be highly diverse in nature.

It can, for example, be chosen from at least one of the following families of active ingredients: organic UV-absorbing compounds, inorganic UV screening agents, such as $TiO_2$, $ZnO$ or $CeO_2$, fluorescent agents, organic or inorganic coloring agents, organic infrared-absorbing compounds, optical brighteners, bactericides, virucides, additives, such as antioxidants or free radical deactivators, and stabilizers.

As specified below, the process according to the invention is very particularly advantageous for the deposition, at the surface of a support, of UV absorber(s). These UV absorbers can more particularly be organic UV absorbers and be chosen in particular from substituted benzotriazoles, hydroxybenzophenones, or pyrene and its derivatives.

For obvious reasons, the nanoparticles according to the invention can be employed for the purposes of functionalizing other active ingredients than those identified above.

Furthermore, the core of the nanoparticles can comprise one or more different active ingredients.

Likewise, the aqueous dispersion can comprise distinct nanoparticles, that is to say which can be distinguished from one another by the nature of the active ingredient which they contain and/or the nature of the polymer forming their outer layer.

In the nanoparticles in accordance with the invention, said active ingredient(s) and hydrophilic polymer(s) are combined in an active ingredient(s)/hydrophilic polymer(s) ratio by weight varying from 0.2 to 0.4, in particular of the order of 0.3.

These nanoparticles can be prepared in particular according to a process comprising at least the stages consisting in:

having available an organic phase, such as methylethylketone or cyclohexane, comprising said active ingredient in the solute state, having available an aqueous phase comprising at least one hydrophilic polymer, adding the organic phase to the aqueous phase under conditions propitious to the formation of an emulsion of the type consisting of an organic phase in an aqueous phase and in the presence of at least one surfactant capable of stabilizing said emulsion, carrying out a thermal quenching of the emulsion thus obtained in order to form said nanoparticles, and isolating said nanoparticles.

The nanoparticles can in particular be isolated from the medium in which they are present by lyophilizing the medium.

The organic phase can comprise from 5 to 20% by weight of active ingredient(s), with respect to its total weight.

The aqueous phase can comprise water and/or at least one water-soluble solvent, such as, for example, lower monoalcohols having from 1 to 5 carbon atoms, such as ethanol and isopropanol, glycols having from 2 to 8 carbon atoms, such as ethylene glycol, propylene glycol, 1,3-butylene glycol and dipropylene glycol, $C_3$-$C_4$ ketones and $C_2$-$C_4$ aldehydes.

The hydrophilic polymer can be formulated at a concentration varying from 2 to 10% by weight, indeed even from 3 to 8% by weight, with respect to the weight of the organic phase under consideration.

As specified above, the polymer or blend of polymers and the active ingredient(s) are brought together in amounts of polymer(s) and active ingredient(s) adjusted in order for the nanoparticles to have an active ingredient(s)/hydrophilic polymer(s) ratio by weight varying from 0.2 to 0.4.

Of course, a person skilled in the art is in a position to make the necessary adjustments to the concentrations of hydrophilic polymers and organic compounds in order to obtain nanoparticles having an active ingredient(s)/hydrophilic polymer(s) ratio by weight varying from 0.2 to 0.4.

Process

The process according to the invention involves bringing the surface of the substrate to be treated into contact with an aqueous dispersion of nanoparticles.

An aqueous dispersion of nanoparticles according to the invention can be formed by dispersing, in an aqueous phase, a powder composed of nanoparticles, in particular as obtained on conclusion of the preparation process described above.

Advantageously, the powder is easily dispersible in an aqueous medium.

The amount of nanoparticles in this dispersion is generally adjusted from the viewpoint of the surface to be treated. Its assessment clearly comes within the competence of a person skilled in the art.

Advantageously, the aqueous dispersion can have at least 0.01% by weight and in particular from 1% to 30% by weight of nanoparticles.

These nanoparticles are kept in suspension in an aqueous phase. This aqueous phase can be as defined above.

Advantageously, the aqueous phase is devoid of organic binder.

On the other hand, this aqueous phase, dedicated to the deposition of nanoparticles on the surface to be treated, can, of course, comprise other additives intended either to improve its qualities during the spraying and/or the application or to confer supplementary properties on the corresponding coating.

They can, for example, be dispersing agents of polycarbonate type, for example carboxylic acid or stearic acid.

The aqueous dispersion can be applied to the substrate by any conventional application method propitious to the deposition of a solution on a solid surface, such as, for example, application with a brush, printing (inkjet, offset), coating, spin coating, spraying or direct immersion of the substrates, the surface of which it is desired to treat, in the aqueous dispersion.

These application techniques clearly come within the competence of a person skilled in the art and are not described here in a detailed manner.

The process according to the invention additionally comprises a stage of formation of a polymeric film, which is provided in the form of a coating of nanoparticles, by drying the surface coated with the aqueous dispersion and in particular the removal of the solvents forming the aqueous phase.

This removal of the solvents can be carried out spontaneously at ambient temperature, for example by simple drying or wringing at ambient temperature, or can be stimulated by heat treatment, for example by fixing with steam.

The drying can also be due to a combining of the reactants or to a crosslinking of the polymers.

This heat treatment can be carried out by external heating of the substrate. Any heating method can be envisaged, such as, for example, those consisting in directly heating the substrate or also those involving the exposure of the substrate in an oven in which hot air circulates or a vacuum oven.

Generally, the temperature of such a treatment will not exceed 150° C.

More particularly, the stage of formation of the polymeric film formed of said nanoparticles can be carried out at a temperature varying from 15° C. to 150° C. and more particularly from 20° C. to 100° C.

As specified above, it is possible, on conclusion of this drying, to carry out a fresh application of a layer of the aqueous dispersion of nanoparticles on a first layer of nanoparticles.

Another subject matter of the present invention is the materials coated with a film formed by the process as described above.

The nanoparticles under consideration according to the invention can be employed in the context of the surface functionalization of a great diversity of materials.

They can be organic materials, in particular of polymeric nature, or inorganic materials, such as metals, ceramics or glasses.

Thus, in the field of polymer materials, they can in particular be materials of the following types: elastomers, adhesives, paints or other types of coatings.

Another subject matter of the present invention is a process for the functionalization and in particular for the photochemical stabilization of uncolored, colored or printed fibrous materials, for example comprising silk, leather, wool, polyamides, polyesters or polyurethanes, and more particularly fibrous materials comprising cellulose, such as cotton, flax or jute, and also viscose fibers and regenerated cellulose.

The textile material to be protected can be a dyed textile material, in particular a textile material dyed with dyes dispersed in an aqueous solution.

It can also be a cellulose material, such as paper or board.

The invention will now be described by means of the following examples and figures, given, of course, by way of illustration and without implied limitation of the invention.

EXAMPLE 1

A solution S1 is prepared from 6 ml of a 4% by weight aqueous polyvinyl alcohol (Mw 31000-50000) (Mowiol®) solution and 0.3 g of sodium dodecyl sulfate.

A solution S2 of a fluorescent dye (coumarin) is prepared by withdrawing 22.4 ml of supernatant after dissolving 1.29 g of the dye in 80 ml of methyl ethyl ketone with stirring.

The solution S2 is added, dropwise and at ambient temperature, to the solution S1 with vigorous stirring by use of a mechanical stirrer with a stirring rotor. Stirring is maintained for 2 hours in order for the emulsion to homogenize.

The emulsion S3 is subsequently introduced dropwise into liquid nitrogen in order to solidify the droplets in the form of nanoparticles. The combined product is subsequently filtered and lyophilized using a freeze dryer or a Schlenk line maintained under dynamic vacuum by a vane pump and equipped with a cold trap for 24 hours.

The fluorescent powder thus obtained is easily redispersed with water and, as illustrated in FIG. 1, exhibits the absorption spectrum characteristic of the starting dye.

The solution thus obtained is applied, for example, to a textile substrate by dipping this substrate in said solution and then wringing out.

EXAMPLE 2

The nanoparticles are prepared according to the procedure described in example 1 by using, as solution S1, a solution S1' prepared from 6 ml of a 5% by weight aqueous polyvinyl alcohol (Mw 31000-50000) (Mowiol®) solution and 0.3 of sodium dodecyl sulfate and, as solution S2, a solution S2' prepared by dissolving 0.5 g of zinc oxide (ZnO) (Z805 from VP Adnano®) in 90 ml of methyl ethyl ketone with stirring.

Figure 2:
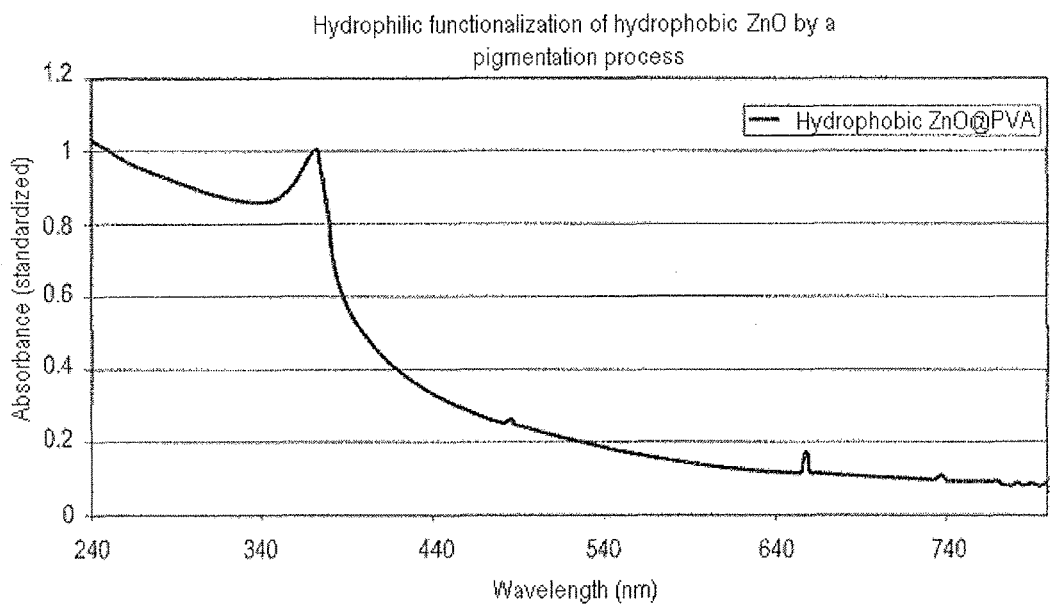
FIG. 2 is an absorbance spectrum of a sample of ZnO functionalized by a pigmentation process. The powder exhibits an absorption spectrum that is characteristic of the starting zinc oxide.

The powder thus obtained is easily redispersed in water and, as illustrated in FIG. 2, exhibits an absorption spectrum characteristic of the starting zinc oxide.

The solution thus obtained is applied in the same way as in example 1.

EXAMPLE 3

Nanoparticles are prepared according to the procedure described in example 1 but using, as solution S2, a solution S2" prepared by dissolving 0.46 g of pyrene-1-carboxylic acid in 70 ml of methyl ethyl ketone with stirring at moderate heating, that is to say a temperature of less than 30° C., indeed even at ambient temperature.

The powder thus obtained is easy to redisperse with water and exhibits an absorption spectrum characteristic of the starting molecule.

A sample of fabric (SAM1) is impregnated according to the padding technique with a concentrated aqueous solution of nanoparticles of pyrene-1-carboxylic acid comprising 6.82 mg/ml of active molecule obtained according to the process described above.

Another sample of fabric (SAM2), referred to as reference, is treated in parallel with a concentrated aqueous solution of pyrene-1-carboxylic acid comprising 6.82 mg/ml in a basic medium.

The two samples obtained are virtually white (original color of the fabric).

SAM1 and SAM2 are subjected to an aging test in a Suntest chamber from Atlas.

The aging conditions are as follows: irradiance at 550 W/m$^2$, xenon arc lamp equipped with a "sheet glass" filter which cuts off the UV radiation below 310 nm, exposure time 72 h.

On conclusion of this aging test, SAM1 has very slightly yellowed, whereas SAM2 has become brown (color characteristic of the decomposition of pyrene-1-carboxylic acid).

The treatment of the present invention clearly makes it possible to improve the resistance to light of sensitive molecules.

The invention claimed is:

1. A process of forming a coating based on at least one active ingredient at a surface of a substrate, said process comprising:
   (1) obtaining an aqueous dispersion of nanoparticles comprising a core consisting of one or more active ingredient(s), the core is directly coated with an outer layer formed of one or more hydrophilic polymer(s), said active ingredient(s) and hydrophilic polymer(s) being combined in an active ingredient(s)/hydrophilic polymer(s) ratio by weight varying from 0.2 to 0.4;
   (2) bringing said surface of said substrate into contact with said aqueous dispersion; and (3) exposing said substrate obtained on conclusion of (2) to conditions propitious to the formation, at the surface of said substrate, of a polymeric film formed of said nanoparticles;

wherein said one or more active ingredient(s) is (are) chosen from organic UV-absorbing compounds, inorganic UV screening agents and fluorescent agents, wherein said nanoparticles of (1) are prepared according to a process comprising:

obtaining an organic phase comprising said one or more active ingredient(s) in a solute state;

obtaining an aqueous phase comprising the one or more hydrophilic polymer(s);

adding the organic phase to the aqueous phase under conditions propitious to the formation of an emulsion, wherein the organic phase is dispersed in the aqueous phase, and wherein the emulsion includes at least one surfactant capable of stabilizing the emulsion;

carrying out a thermal quenching of the emulsion thus obtained in order to form said nanoparticles; and isolating said nanoparticles.

2. The process of claim 1, wherein the substrate is an organic substrate.

3. The process of claim 1, wherein the combined stages (2) and (3) are repeated at least once on conclusion of (3).

4. The process of claim 1, wherein the coating of said substrate obtained on conclusion of said process has a density of active ingredient(s) at least equal to 1 g per $m^2$ of coating.

5. The process of claim 1, wherein (3) is a drying stage.

6. The process of claim 1, wherein the one or more hydrophilic polymer(s) have a molecular weight of greater than 10,000 g/mol.

7. The process of claim 1, wherein the one or more hydrophilic polymer(s) have a molecular weight of greater than 20,000 g/mol.

8. The process of claim 1, wherein the one or more hydrophilic polymer(s) have a molecular weight varying from 25,000 to 600,000 g/mol.

9. The process of claim 1, wherein the one or more hydrophilic polymer(s) are chosen from polyvinyl alcohols, dextran, sodium alginate, polyaspartic acid, polyethylene glycol, polyvinylpyrrolidone, polyacrylic acid and its salts, polyacrylamide, poly(N-isopropylacrylamide), poly(hydroxyethyl acrylate), poly(sodium styrenesulfonate), poly(2-acryl-amido-2-methyl-1-propylenesulfonic acid), polysaccharides, cellulose derivatives, copolymers of the abovementioned polymers and their blends.

10. The process of claim 1, wherein the one or more hydrophilic polymer(s) are a polyvinyl alcohol or a polyacrylic acid.

11. The process of claim 10, wherein said polyacrylic acid has a molecular weight ranging from 10,000 to 600,000 g/mol.

12. The process of claim 10, wherein said polyacrylic acid has a molecular weight ranging from 100,000 to 600,000 g/mol.

13. The process of claim 1, wherein the nanoparticles have an outer layer formed of at least one polyvinyl alcohol with a molecular weight of greater than 10,000 g/mol.

14. The process of claim 1, wherein the nanoparticles have an outer layer formed of at least one polyvinyl alcohol with a molecular weight of greater than 20,000 g/mol.

15. The process of claim 1, wherein the nanoparticles have an outer layer formed of at least one polyvinyl alcohol with a molecular weight varying from 25,000 to 50,000 g/mol.

16. The process of claim 1, wherein the nanoparticles have a mean size of less than 500 nm.

17. The process of claim 1, wherein said organic UV-absorbing compound is chosen from substituted benzotriazoles, hydroxybenzophenones, or pyrene and its derivatives.

18. The process of claim 17, wherein said coating formed has properties of absorbing ultraviolet radiation.

19. The process of claim 1, wherein (3) is carried out at a temperature varying from 15° C. to 150° C.

20. The process of claim 1, wherein the substrate is formed of at least one polymeric material.

21. The process of claim 1, wherein the substrate is a textile.

* * * * *